Jan. 14, 1947.  G. A. F. MACHLET  2,414,314
MEASURING AND CONTROL APPARATUS
Filed Nov. 25, 1941  3 Sheets-Sheet 1

Inventor:
George A. F. Machlet,
By
Pierce + Scheffler,
Attorneys.

Jan. 14, 1947.　　　G. A. F. MACHLET　　　2,414,314
MEASURING AND CONTROL APPARATUS
Filed Nov. 25, 1941　　　3 Sheets-Sheet 2
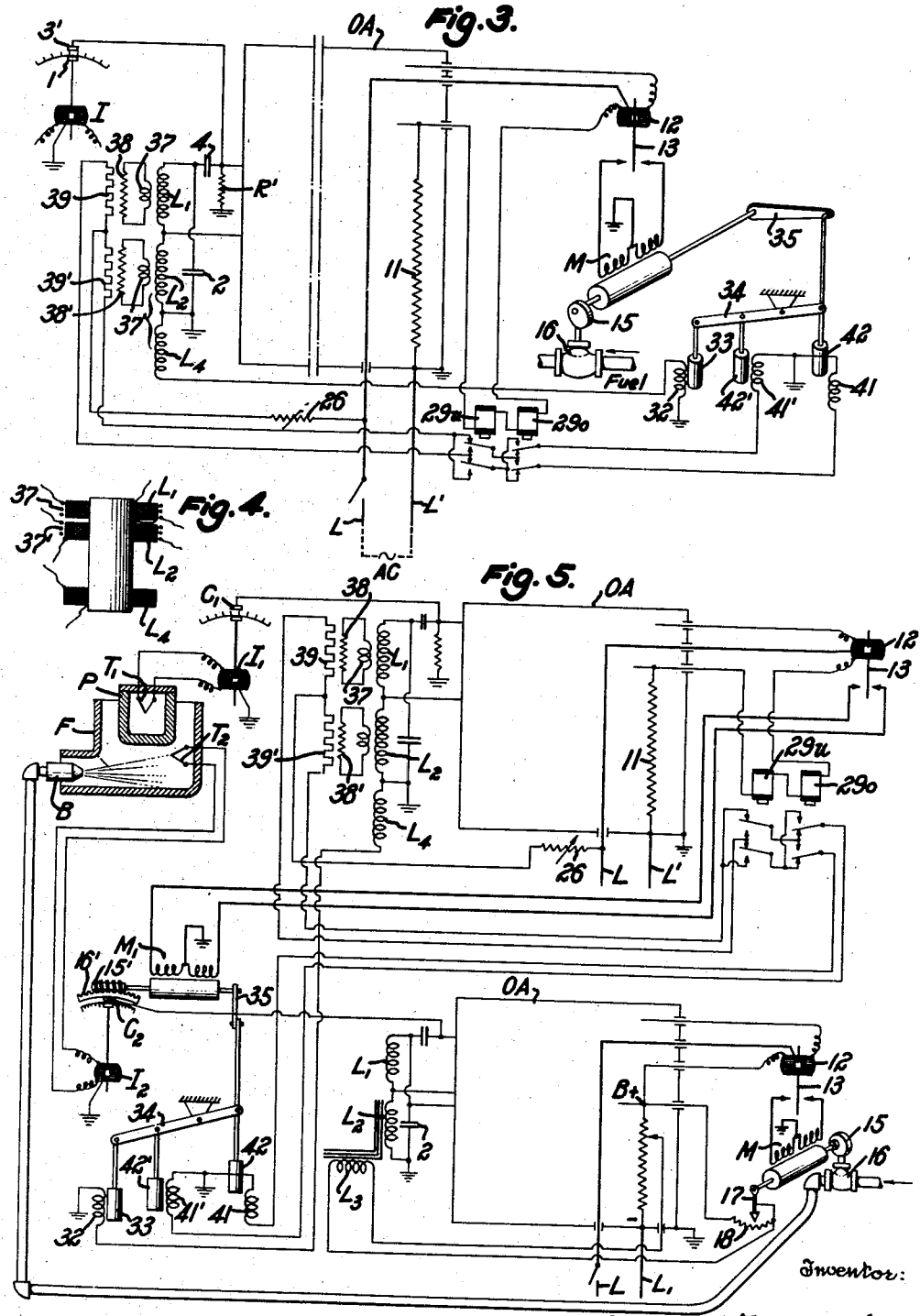
Inventor:
George A. F. Machlet,
by Pierce + Scheffler
Attorneys.

Jan. 14, 1947.   G. A. F. MACHLET   2,414,314
MEASURING AND CONTROL APPARATUS
Filed Nov. 25, 1941   3 Sheets-Sheet 3

Inventor:
George A. F. Machlet,
By
Pierce + Scheffler
Attorneys

Patented Jan. 14, 1947

2,414,314

REISSUED

OCT 2 5 1949

UNITED STATES PATENT OFFICE 2,414,314

MEASURING AND CONTROL APPARATUS

George A. F. Machlet, Elizabeth, N. J.

Application November 25, 1941, Serial No. 420,442

51 Claims. (Cl. 236—69)

This invention relates to measuring and control apparatus, and more particularly to apparatus of high sensitivity that responds to variations in one or more factors, such as temperature, pressure, direction, current flow or the like, to record the changes in value and/or to energize a control system in accordance with the change in a control function or the integrated changes in a plurality of control factors.

For simplicity of explanation, the invention will be described with reference to control systems for regulating the supply of a fluid fuel to a burner to maintain a desired temperature within an oven or treating chamber, which temperature may be constant or varied by a progressive control system, but it is to be understood that the control action may be based upon some function or quality other than temperature and that the controlled element may be a recording stylus or a modulating device other than a fuel supply valve.

Electronic recording and control systems have been employed to obtain a proportionate response or a corrective influence from highly sensitive measuring instruments that do not develop sufficient force to effect a mechanical closure of relay contacts; and some of the prior systems, for example those disclosed in my prior Patent 2,056,285 and Reissue Patent 21,345, establish a corrective influence that varies in magnitude with the departure of a measured function from a preselected standard value. Such proportioning control systems provide a continuous re-establishment of equilibrium in the controlled process or apparatus by varying the corrective influence in accordance with changes in the supply and/or demand conditions. The control action is based upon the existence of a measurable departure of the magnitude of the controlling function from a preselected value; and the rebalance for establishing an equilibrium between demand and supply factors, upon variation in the magnitude of either or both, has not been effected at the one preselected value of the controlling function but over a value range determined by the sensitivity of the control apparatus and by the time delay between a change in operating conditions and the detection of a measurable variation in the magnitude of the controlling function.

The stabilization of the conditions affecting the process was thus obtained by a rebalance of the control system at an operating point other than the desired preselected value of the controlling function in the prior proportioning control systems of the electronic type. The present invention contemplates a rebalance of the control system at the preselected operating point, i. e. at the desired value of the control function, upon any variation of the process conditions that effects a departure of the measured function from a preselected value. The rebalance of the control system for operation about a single control point will be designated hereinafter as a "resetting" of the control system, thereby to distinguish from the rebalancing of the operating conditions affecting the process. The operations for rebalancing the process conditions and for resetting the control system take place at the same time but the resetting of the control system must proceed more slowly than the rebalancing of the conditions affecting the process to avoid conflict between these operations and to insure a final equilibrium.

Objects of the present invention are to provide electronic measuring and/or control systems of simple and efficient design that effect a rebalance of conditions affecting the controlled process or apparatus by a complementary rebalance of the control system. An object is to provide measuring and/or control systems of high sensitivity that include devices for effecting an initial and rapid rebalance of the operating conditions affecting a controlled process or apparatus upon the departure of a controlling function from a preselected value, and for effecting a subsequent resetting of the measuring and/or control system for operation at the preselected value. Other objects are to provide simple and effective control systems for regulating the heat supplied to an oven, retort or the like in accordance with the temperatures at the exterior of and within the heated device, thereby to reduce the temperature fluctuations within a device across which there is a substantial temperature drop.

These and other objects and advantages of the invention will be apparent from the following specification when taken with the accompanying drawings in which:

Fig. 3 is a fragmentary circuit diagram of another embodiment in which the resetting devices include adjustable reactors;

Fig. 4 is a central vertical section through the oscillator coils and associated elements of the Fig. 3 circuit;

Fig. 5 is a circuit diagram of a control system, including two associated control circuits, for regulating the heat input to an oven or retort in response to temperature changes within and at the exterior of the oven or retort.

Figure 1:
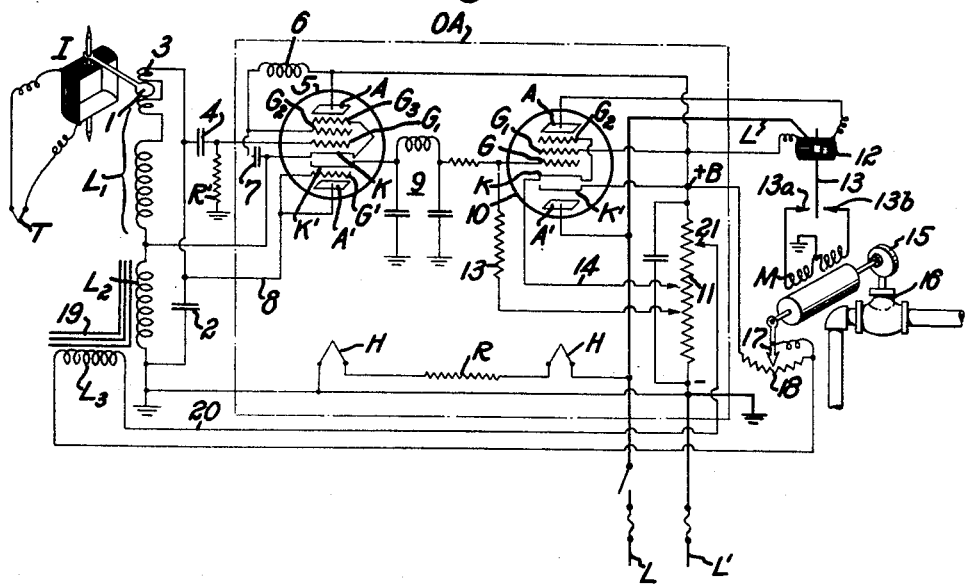
Fig. 1 is a circuit diagram of an embodiment of the invention as applied to the regulation of the fuel supply to a heating furnace.

In the drawings, the reference character I identifies a sensitive measuring instrument having a movable system that is displaced angularly in accordance with the voltage developed by a thermocouple T, the pointer of the moving system carrying a small vane 1 that affects, in accordance with its displacement, the oscillatory conditions in an oscillatory circuit comprising the coupled inductances L1, L2 and a tuning condenser 2. The moving vane 1 may alter the capacity across one or both of the inductances, the coupling between the inductances or, as illustrated in Fig. 1, the effective value of a split inductance 3 that is a part of the inductance L1.

The high potential terminal of the oscillatory circuit is connected through a coupling condenser 4 to the control grid G1 of an oscillator tube 5 in conventional manner. The oscillator tube elements, as illustrated, include a screen grid G2 connected to the anode A through a radio frequency choke 6 and to the cathode K through condenser 7, and a suppressor grid G3 that is connected to the cathode K within the tube. The junction of the inductances L1, L2 is connected to the cathode K, the outer terminal of L2 is grounded, and the control grid is returned to ground through the usual bias resistor R'.

The oscillatory current developed in the oscillatory circuit is impressed upon a rectifier by a lead 8 that extends to the joined grid electrode G' and plate A' that cooperate with a second cathode K' within the tube 5. Separate oscillator and rectifier tubes may of course be substituted for the dual purpose tube 5 shown in Fig. 1. The rectifier cathode K' is connected through a filter network 9 to the control grid G of the amplifier elements of a second dual purpose tube 10. The screen grid G1 is connected directly to the positive terminal +B of a direct current source that may be a voltage divider resistor 11. The suppressor grid G2 is connected to the cathode K of the amplifier, and the anode A is connected to the +B terminal through a sensitive relay that may be of the polarized type or, as shown, an instrument relay having a moving system including the pivoted coil 12 and contact arm 13. The voltage divider 11 is energized through the rectifier section of tube 10, which rectifier comprises a cathode K' connected to the +B terminal and an anode A' that is connected to one side L of a line L, L' that may be a conventional 110 volts light and power circuit fed from a direct current or an alternating current source. The other side L' of the line is connected to the negative terminal of the voltage divider 11 and to ground. The heaters H of the tubes are connected across the power supply leads L, L' in series with a voltage drop resistor R.

A negative bias is impressed upon the grid G1 of tube 10 by connecting the grid through a high resistance 13 to a more negative point on the voltage divider 11 than that to which the cathode K is connected by a lead 14. The negative bias is of such magnitude that the amplifier is biased to cutoff for values of rectified input to control grid G1 below a certain preselected value. The plate current of the tube 10 is therefore proportional to the intensity of oscillations of the tube 5, and the relay is so adjusted or designed that the movable contact 13 hovers between the opposed stationary contacts 13a, 13b at a definite predetermined plate current value.

The relay contact arm 13 is connected to the power supply lead L, and the contacts 13a, 13b are connected to the outer terminals of the split field windings of a reversible motor M that actuates a recording stylus or, as shown, a cam 15 or other means for adjusting the modulating valve 16 in the fuel supply system to a furnace or heater. The apparatus for rebalancing the system upon a change in operating conditions comprises a saturating core reactor having a winding L3 to which the current flow is varied as a function of the setting of the fuel valve 16. The shaft of the motor M adjusts a contact arm 17 along the resistor 18 that is connected between coil L3 and the +B terminal of the direct current source 11. The other side of the coil L3 is connected by lead 20 to a tap 21 that is adjustable along the voltage divider 11. The coils L2 and L3 are coupled magnetically by the saturating core 19.

Assuming that the oven or furnace temperature is at its normal desired value, the measuring instrument I locates the vane 1 in such position, with respect to the split inductance 3, that the rectified current output of the oscillator-rectifier tube 5 is at the preselected value for which the current output of the tube 10 holds the relay contact arm 13 in open circuit position in the narrow gap between the contacts 13a, 13b. A change in the temperature at the thermocouple T will alter the voltage input to the sensitive measuring instrument I and thus displace the vane 1 with respect to the split inductance 3. The oscillator balance is thus disturbed and the current flow thereby altered, and in turn the plate current of the amplifier tube 10 is altered and the relay contacts close to energize the motor M for operation to adjust the fuel supply valve 16 in the proper sense. Assuming that the vane movement is such that the tendency towards oscillation is reduced, the motor M rotates clockwise until a rebalance is effected by the increased flow of current to coil L3 of the saturating core reactor. The increased current input to coil L3, due to the reduction in the effective value of the resistor 18, increases the tendency towards oscillation and the rectified current output of the oscillator-rectifier tube 5 thus increases until the plate current output of the amplifier 10 shifts the relay contact arm 13 back to open circuit position.

It is to be noted that this rebalance of the operating conditions is not effected at the preselected normal temperature but at some value that differs from normal by an increment that varies with the sensitivity of the control system, the time lag between fuel supply changes and temperature changes, and other factors. The corrective action is proportional to the temperature change when, as is desirable, the relay contacts 13a, 13b are closely spaced to limit the "neutral" range of the control relay to a negligible value. The system can be reset for operation at the desired control point by introducing a delayed corrective action through electrically heated elements that affect the oscillatory circuit.

Figure 2:
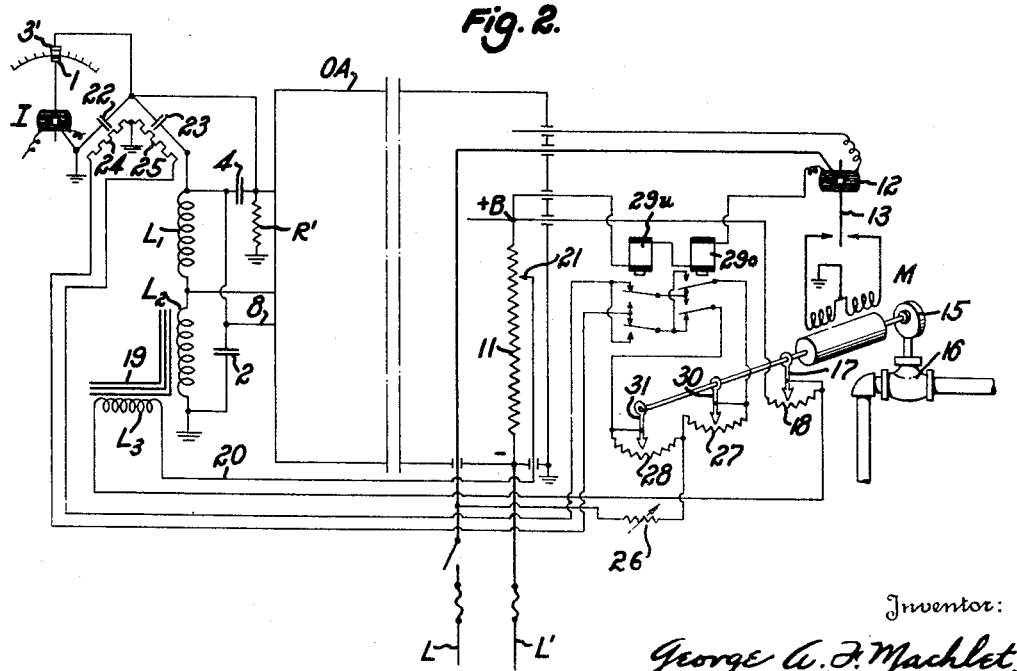
Fig. 2 is a fragmentary circuit diagram of an embodiment including elements for resetting the control system to operate about a preselected control point.

The resetting control system of Fig. 2 includes all elements of the Fig. 1 circuit except that the instrument controlled variable element takes the form of a condenser blade 1 that moves with respect to a stationary condenser plate 3' that is connected to the high potential end of the oscillator inductances L1, L2. For greater clarity of illustration of the resetting circuit elements, the oscillator and amplifier section of the system that lies within the broken line rectangle OA of Fig. 1 is indicated by the block element OA in Fig. 2. The rebalance of operating conditions is effected, as described above, by the motor-produced adjustment of the resistor arm 17 to alter the current flow to the coil L3 of the saturating core reactor.

The resetting system comprises temperature-variant condensers 22, 23 shunted across the instrument condenser 1—3' and the coupling condenser 4, respectively, and the associated heater resistances 24, 25 that have a common grounded terminal and receive currents that are varied in magnitude, and in opposite sense, by the motor M. The current supply to the heater resistances is from the power lead L, through the adjustable series resistor 26 to the common terminal of the resistors 27, 28 whose outer terminals are connected to the heater resistors 24, 25, respectively, through the contacts of the undercurrent relay 29u and the overcurrent relay 29o that are serially arranged in the plate circuit of the output tube 10. The effective values of the resistors 27, 28 are adjusted in opposite sense, upon rotation of the motor M, by contact arms 30, 31, respectively, that are carried by the motor shaft and connected to the outer terminals of the resistors. The switch systems of the relays 29u, 29o are of the double pole, double throw type and comprise serially arranged polarity reversing switches between the adjustable resistors 27, 28 and the heating resistors 24, 25 of the temperature-variant capacitors 22, 23, respectively. Under normal operating conditions, the plate current of tube 10 is sufficient to energize the undercurrent relay 27u to attract the armature but is below the value that will lift the armature of the overcurrent relay 29o. When the measured temperature departs substantially from the normal control range, the plate current of tube 10 drops below or rises above its normal range of variation for modulated control of the heat input, and the undercurrent relay 29u drops to open position or the overcurrent relay 29o closes. Each of these operations will reverse the connections between the outer terminals of the control resistors 27, 28 and the heating resistors 24, 25. For all conditions of the polarity reversing relays 29u, 29o, the angular movement of the motor shaft adjusts the effective values of the resistors 27, 28 in opposite sense, and thereby alters the current flow in the heater resistors 24, 25 in opposite sense to effect corresponding changes in the effective values of the condensers 22, 23.

Assuming, as in the above discussion of the Fig. 1 circuit that the operating conditions alter from normal in such sense that the instrument I moves the vane 1 to reduce the tendency towards oscillation, the relay coil 12 closes the contacts to energize the motor M to adjust the fuel supply valve 16. The rebalance of operating conditions is effected at once by the adjustment of the value of resistor 18 to alter the current flow to the winding L3 of the saturating core reactor. At the same time, the rotation of the motor shaft alters the relative values of the currents supplied to the heaters 24, 25 in such sense that the associated condensers 22, 23, respectively, assume new values that tend to decrease the tendency towards oscillation, i. e. the value of the condenser 22 is decreased while that of condenser 23 is increased. This change in the values of condensers 22, 23 takes place at a relatively slow rate and gives rise to a further unbalance of the oscillatory system, resulting from and approximately equal to the initial unbalance due to instrument-produced movement of the vane 1, that produces another energization of the motor M to effect a further adjustment, and in the same sense, of the fuel supply valve 16. The fuel supply is thereby adjusted beyond the point that establishes a rebalance of the operating conditions at a new temperature, and this exaggerated change in the fuel supply results in a shift of the furnace temperature back to its initial preselected value.

The undercurrent relay 29u reverses the resetting circuit connections when the measured temperature is below the effective control range of the apparatus. This condition will arise when a furnace is started "cold" or when the control point is adjusted to a new temperature value during the heating process. If the resetting system remains operative during a relatively long heating-up period, the temperature-variant condensers 23, 22 will accentuate the unbalance of the oscillatory circuit and thereby delay the initial closing adjustment of the fuel valve 16 until the furnace temperature reaches a value substantially above the lower limit of the normal control range. The resetting system would thus function to shift the desired control point to a higher value, and a number of over-adjustments of the fuel valve would be effected before stable operating conditions were established. The resetting system is therefore rendered inoperative or, as illustrated, is preferably reversed in its sense of operation to accelerate a modulating control action as the measured temperature approaches the normal control range. The overcurrent relay 29o is similarly operative to reverse the sense of operation of the resetting system when the measured temperature is substantially above the normal control range. This condition may arise in the operation of a program control system when the temperature control point is suddenly shifted to a lower value.

The plate current of tube 10 may vary from about 6 to 15 milliamperes to adjust the modulating fuel valve 16 from its closed to open position, and the relays 29u and 29o are then adjusted for a drop out of relay 29u when the plate current drops below 6 milliamperes and an energization of relay 29o when the plate current rises above about 15 milliamperes. One of the polarity reversing relays may be omitted when the particular heating process is of such nature that the measured temperature can depart in only one sense from the normal control range. The reversal of the resetting action is usually desirable to accelerate the control action when the measured temperature is outside of the normal control range for a substantial time interval. It is practical in some installations, however, to obtain a satisfactory control of temperature by rendering the resetting system inoperative when the measured temperature is outside of the control range. This method of operation can be obtained by substituting single throw switches for the illustrated double throw reversing switch of the relays 29u, 29o.

Another embodiment of the invention, as illustrated in Fig. 3, includes an oscillator-amplifier system OA similar to or identical with that shown in Fig. 1. The initial unbalance of the oscillatory circuit may be effected by the inductance varying system of Fig. 1 or, as illustrated, by a small instrument-controlled condenser 1, 3' such as shown in Fig. 2. The control of the relay 12, 13, motor M, and fuel supply valve 16 may be substantially as previously described, but the elements for rebalancing the operating conditions and for resetting the control circuit differ from those previously described. The power supply to leads L, L' for energizing the system must be from an alternating current source AC in this form of the invention.

The oscillatory circuit inductances L1, L2 are of conventional design, and the rebalancing coil L4 has a loose magnetic coupling to the oscillator coil L2. The coil L4 is connected to an inductance 32 that is varied in magnitude by a core 33, of magnetic or non-magnetic material, on a lever or walking beam 34 that is adjusted angularly by a crank arm 35 on the shaft of the motor M. Current flow in the oscillatory circuit is affected by the impedance of the coupled circuit that includes the coil L4 and the inductance 32, and this impedance is altered by movement of the core 33 in such sense that an initial rebalance of the operating conditions is effected when the motor M is energized as the result of a displacement of the instrument-carried vane 1 with respect to the condenser plate 3'.

The resetting of the system to the original control point is effected by varying the effective values of the inductances 37, 37' that are coupled to the oscillator coils L1, L2, respectively. The inductances 37, 37' comprise a few turns of wire wound upon the associated coils, see Fig. 4, and in closed series circuits with temperature-variant resistances 38, 38', respectively, of wire, preferably nickel wire, that have associated heater resistances 39, 39', respectively. The junction of the heater resistances is connected to the power supply lead L through an adjustable resistance 26, and the outer terminals of the heater resistances are connected to adjustable inductances 41, 41' through the polarity reversing switch contacts of relays 29u, 29o, to the power lead L', through inductances 41, 41' that have associated cores 42, 42' suspended from the lever 34 at opposite sides of its pivot point. A tilting of the lever 34 by the motor M thus varies the effective values of the inductances 41, 41' in opposite sense, and thereby effects corresponding variations in the currents supplied to the heater resistances 39, 39'. The relays 29u, 29o provide means for reversing or for rendering inoperative the resetting system when the measured temperature is outside of the normal temperature control range of the apparatus.

The circuit connections are such that an operation of the motor M in response to the initial unbalance of the oscillatory circuit by a measured change in the control temperature alters the heating of the resistances 38, 38' to shift the effective values of the inductances L1, L2 to increase the unbalancing effect. This increased unbalancing or resetting action is not immediately effective but becomes apparent after the initial rebalance of the operating conditions by the variation in the value of the inductance 32 in series with the rebalancing coil L4.

It has been difficult to obtain a close regulation of the temperature within ovens, crucibles and other heated units that have a relatively high temperature difference or thermal drop across a heat-transmitting wall. An automatic control based upon the temperature within the heated unit will not respond quickly to changes in the rates of heat input and of heat demand, and a control based upon the external temperature is not possible for processes in which the heat requirement varies during the process or in which the internal temperature is to be set at different values, either manually or automatically, during the progress of the process.

According to this invention, the automatic temperature regulator includes a primary control system that responds to the interior temperature to adjust the balance of operating point of a second control system that regulates the rate of heat input and, except as modified by the supervisory action of the primary control system, functions to maintain a constant temperature at the exterior of the heated unit. The adjustment of the second control system may be effected by a mechanical, a magnetic or an electrical coupling of the control systems.

The embodiment of the invention that is illustrated in Fig. 5 includes a mechanical coupling between a resetting control system such as shown in Fig. 3 and a control system of the type shown in Fig. 1. The equipment to which the temperature control is applied is shown diagrammatically as a crucible or pot P in a furnace chamber F that is heated by gas or liquid fuel supplied through a burner B. Thermocouples T1, T2 are located within the pot P and in the combustion space at the exterior of the pot, respectively, and are electrically connected to the temperature measuring instruments 11, 12 that actuate small condensers C1, C2 in the oscillatory circuits of the primary and the secondary control systems, respectively. The relatively stationary vane of the condenser C2 of the secondary control system is carried by an arcuate rack 16' that is adjusted angularly by a worm 15' on the shaft of motor M1 of the primary control system. The primary control system of Fig. 5 is identical with that shown in Fig. 3 except for this substitution of worm 15' and rack 16' for the cam 15 and valve 16 of Fig. 3. The elements of the primary control circuit are identified by the reference numerals of Fig. 3 but will not be described in detail.

The secondary control circuit is identical with that of Fig. 1 except for the substitution of the condenser C2 for the vane 1 and inductance 3 of the Fig. 1 circuit. The corresponding parts of the circuits of Figs. 1 and 5 are identified by like reference numerals.

The method of operation of the temperature regulating apparatus will be described upon the assumption that the temperature within the pot P has attained the preselected control value and that both the primary and the secondary control systems are balanced, i. e. the relay circuits to the motors M1 and M of the respective control systems are both open. Variations in the fuel supply pressure or in draft conditions which cause a change in the temperature at the thermocouple T2 are compensated, as described above with reference to Fig. 1, by an unbalance of the oscillatory circuit L1, L2, through a change in the value of the condenser C2, and this unbalance energizes the motor M to adjust the fuel supply valve 16. A new balance of the operating conditions is effected by the adjustment of contact arm 17 along resistor 18 to alter the flow of direct current to coil L3 of the saturating core reactor. This control action takes place promptly and holds the temperature at the exterior of the pot P within close limits as the control system may be designed for high sensitivity. A change in temperature within the pot P results in a displacement of the movable vane of the condenser C1, and thereby unbalances the oscillatory circuit and energizes the circuit of motor M1 for rotation in the appropriate sense until the operating conditions are rebalanced by the change in the value of the inductance 32 in series with the rebalancing coil L4. This rebalancing operation takes place as described above with reference to the control system of Fig. 5, and is accompanied by changes in opposite sense of the values of the variable iron-cored inductances 41, 41' of the resetting system, and by a displacement of the relatively stationary vane of the condenser C2 of the control system associated with the external thermocouple T2. The resetting operation takes place after a time delay, as described above, to reset the control point of the interior temperature control system to its original value.

The motor M1 does not directly alter the fuel supply but establishes a new control point for the temperature measurements by the thermocouple T2 at the exterior of the pot P. The external control system is thereby unbalanced and to an extent substantially greater than is produced by the normal fluctuations in temperature within the combustion zone. The motor M is energized to alter the setting of the fuel supply valve 16, but the operating conditions of the external temperature control system are not immediately rebalanced by the adjustment of the contact 17 along resistance 18 of the rebalancing circuit. Assuming that the temperature increased a few degrees within the pot P, the rebalance of the internal control system will decrease the control point of the external temperature control system by a far greater increment, for example will adjust the condenser C2 for a lowering of the external temperature by 100°. The maximum change in current flow to the rebalancing coil L3 of the external control system will not rebalance the operating conditions, and a rebalance is effected only by a reduction in the external temperature, at thermocouple T2, that results in a movement of the pointer of instrument 12 to bring the movable vane of condenser C2 into proximity to the relatively stationary vane.

A small increase in the temperature within the pot P thus results in a greatly exaggerated drop in the temperature at the exterior of the pot, and thereby quickly counteracts the rise in internal temperature. The time delay of the prior control systems is eliminated and the temperature within the heated receptacle can be maintained within close limits in spite of the thermal inertia or high temperature drop across the walls of the receptacle.

Figure 6:
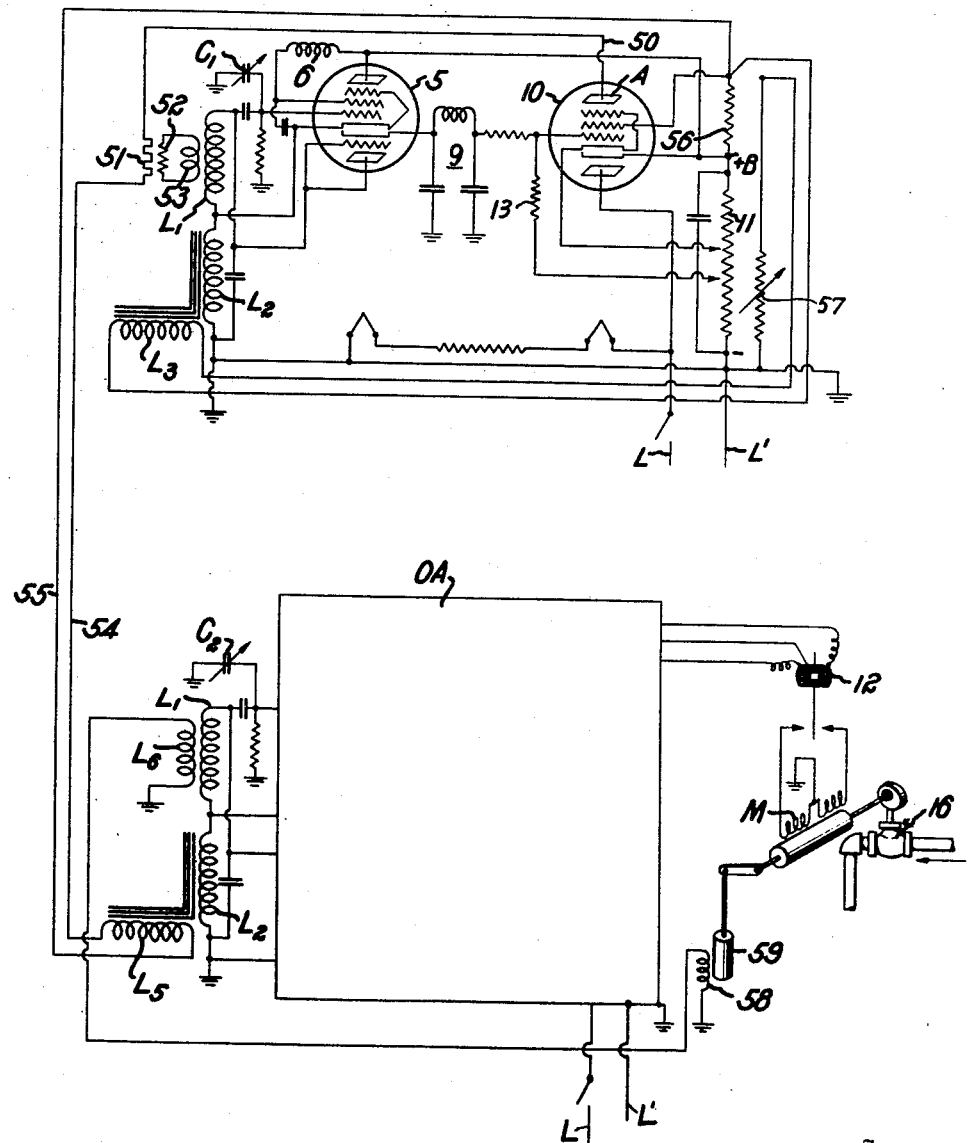
Fig. 6 is a circuit diagram of another embodiment of a temperature control system of the dual control type of Fig. 5.

Another embodiment of a dual control system for establishing a desired temperature within a heated receptacle is illustrated in Fig. 6. The control system that responds to variations in the internal temperature includes a thermocouple and instrument, not shown, for adjusting the effective value of the small condenser C1, and the network associated with the oscillator tube 5 and amplifier tube 10 is generally similar to the network illustrated in Fig. 1. The network differs from the Fig. 1 circuit in the elimination of the relay 12 as the control action results directly from variations in the plate current flow in the amplifier tube 10. Lead 50 extends from the anode A of tube 10 to the heating resistor 51 of a resetting system comprising a nickel wire 52 in series with a small coil 53 that is coupled to the inductance L1 of the oscillatory circuit. Lead 54 extends from the heater 51 to the coil L5 of a saturating core reactor that is coupled to the inductance L2 of the oscillatory circuit of the external temperature control system, and the anode circuit is completed through lead 55 and a voltage drop resistor 56 to the +B terminal of the plate current supply resistor 11. The rebalancing coil L3 of a saturating core reactor is connected between the anode end of the resistor 56 and ground through a variable sensitivity adjusting resistor 57. The external temperature control system includes an instrument-controlled condenser C2, as in Fig. 5, for unbalancing the oscillatory circuit upon a departure of the external temperature from a selected normal value, an oscillator and amplifier network similar to that of Fig. 1 and as indicated by the block OA, a relay 12 and motor M for adjusting the fuel supply valve 16, and a rebalancing circuit comprising a coil L6 coupled to inductance L7 and in series with a variable iron-core inductance 58, 59, the core 59 being adjustable as a function of the setting of the fuel valve 16.

The method of operation of the Fig. 6 dual control system is similar, in general, to that of the Fig. 5 circuit. Variations in the temperature at the exterior of the heated receptacle result in small variations in the effective value of the condenser C2, and thereby in correspondingly small adjustments of the fuel supply valve. Departures of the internal temperature from its desired value, as reflected in changes in the value of the condenser C1, alter the control point of the external control system in the following manner. Assuming that the internal temperature rises and thereby increases the capacity of the instrument-controlled condenser C1, the intensity of oscillation of tube 5 and the plate current of the amplifier tube 10 are decreased. This decrease in plate current flow results in an increase in the potential at the anode A of tube 10, due to the lesser potential drop across the resistor 56, and the current flow through the rebalancing coil L3 is thereby increased. The immediate effect of this increased current flow to coil L3 is to increase the tendency towards oscillation, thereby establishing an initial rebalance of the operating conditions in the internal temperature control system. The rebalance results in a re-establishment of substantially the normal intensity of oscillation but at a higher value of the capacity C1 which represents a higher internal temperature.

The decrease in the plate current results in a lowering of the temperature of the heating resistor 51, and thereby in the resistance of the nickel wire 52 of the resetting circuit. This change takes place slowly and decreases the intensity of oscillation and establishes conditions for a rebalance only when the value of the capacity C1 decreases to a lower value corresponding to the original desired temperature within the heated receptacle.

In the external temperature control system, the effect of the decreased plate current flow in the tube 10 is to decrease the intensity of oscillation, thereby producing the apparent effect of an increase in the temperature at the exterior of the heated receptacle, whereby the external control system reacts to adjust the fuel supply valve 16 for a lowered heat input. The external control system reaches a rebalance only when the temperature drops to a new value, corresponding to a reduction in the instrument-controlled capacity C2, to a new value that compensates for the unbalance created by the increased current flow through the coil L5.

For simplicity of illustration and description, it has been assumed that the critical control temperature is to be maintained at some one preselected value. It will be apparent that the control temperature may be adjusted on a program control basis, i. e. may be set at different values during the progress of some heating operation or process. The program control may be effected by altering the current flow to a saturating core balancing reactor or by shifting the relatively stationary vane of the miniature control condenser manually or by a clock-controlled motor and worm and gear system similar to the elements 15', 16' of the Fig. 5 control system. Furthermore, the initial unbalance of the control system may be obtained by one or a plurality of means other than an instrument-controlled capacity, inductance or coupling. The external temperature control system of Fig. 6 is an example of a control in response to a plurality of factors, i. e. both the instrument-controlled capacity C2 and the current flow through winding L5 affect the balance of the oscillatory circuit. The values of these factors may vary simultaneously, and in the same or in opposite sense so far as concerns the balance of the oscillatory circuit. The unbalancing effects of the changes in a plurality of control factors may be additive or they may neutralize or partially neutralize each other.

The wide latitude in the design or control of recording circuits embodying the invention is indicated by the foregoing descriptions and accompanying circuit diagrams, and it is to be understood that other variations that may occur to those familiar with this art fall within the spirit of my invention as set forth in the following claims.

I claim:

1. In an electronic measuring or control apparatus responsive to an unbalance in the operating conditions affecting a process or apparatus, the combination with an electronic tube, an input circuit network coupled to said tube and including means responsive to an unbalance of operating conditions to alter the current output of the tube, and an output circuit network coupled to said tube and including means operative by an altered current output to re-establish a balance of the operating conditions, of time-delay means responsive to an initial change in the current output to produce a further change of the current output in the same sense as the initial change, thereby to reset the operating conditions to a balance at the values existing prior to the unbalance, and means operative upon a departure of the magnitude of said current output from a preselected range of values to render said time-delay means inoperative to reset the operating conditions to a balance at the values existing prior to an unbalance.

2. In an electronic measuring or control apparatus responsive to an unbalance in the operating conditions affecting a process or apparatus, the combination with an electronic tube, an input circuit network coupled to said tube and including means responsive to an unbalance of operating conditions to alter the current output of the tube, and an output circuit network coupled to said tube and including means operative by an altered current output to re-establish a balance of the operating conditions, of time-delay means responsive to an initial change in the current output to produce a further change of the current output in the same sense as the initial change, thereby to reset the operating conditions to a balance at the values existing prior to the unbalance, and means operative upon a departure of the magnitude of the said current output from a preselected range of values to reverse the sense of the current output change produced by said time-delay means.

3. An electronic measuring or control apparatus responsive to an unbalance in the operating conditions affecting a process or apparatus and of the type including an electronic tube, an input circuit network connected to said tube and including means responsive to a variation in the magnitude of the selected factor to alter the current output of the tube, and an output circuit network for said tube including means responsive to a change in the tube output current to effect a rebalance of said operating conditions, characterized by the fact that one of said means comprises a saturating core reactor for reflecting an impedance change into said input circuit network upon variation of the current in the direct current coil of the saturating core reactor.

4. An electronic measuring or control apparatus responsive to variations in the magnitude of a selected factor and of the type including an electronic tube, an input circuit network coupled to said tube and normally balanced to establish a preselected current output from said tube at a desired normal value of said factor, means responsive to the variation of the selected factor from a preselected value to disturb the normal balance of said circuit network and thereby alter the current output from said tube, and means responsive to an alteration in the tube output current to rebalance the input circuit network, characterized by the fact that one of said means comprises a saturating core reactor for reflecting an impedance change into said input circuit network upon variation of the current in the direct current coil of the saturating core reactor.

5. An electronic measuring or control apparatus responsive to variations in the magnitude of a selected factor and of the type including an electronic oscillator tube, an oscillatory circuit coupled to said tube and normally balanced to establish a preselected normal intensity of oscillation and thereby a preselected oscillatory current output from said tube, means responsive to the variation of the selected factor from a preselected value to disturb the normal balance of said oscillatory circuit and thereby alter the intensity of oscillation and the current output from said tube, and means responsive to an alteration in the tube output current to rebalance the oscillatory circuit to restore the intensity of oscillation to the preselected normal value, characterized by the fact that one of said means comprises a saturating core reactor for reflecting an impedance change into said input circuit network upon variation of the current in the direct current coil of the saturating core reactor.

6. An electronic measuring or control apparatus responsive to variations in the magnitude of a selected factor and of the type including an electronic oscillator tube, an oscillatory circuit coupled to said tube and normally balanced to establish a preselected normal intensity of oscillation and thereby a preselected oscillatory current output from said tube, means responsive to the variation of the selected factor from a preselected value to disturb the normal balance of said oscillatory circuit and thereby alter the intensity of oscillation and the current output from said tube, and means responsive to an alteration in the tube output current to rebalance the oscillatory circuit to restore the intensity of oscillation to the preselected normal value, characterized by the fact that said rebalancing means comprises a saturating core reactor for reflecting an impedance change into said input circuit network upon variation of the current in the direct current coil of the saturating core reactor.

7. An electronic measuring or control apparatus as claimed in claim 6, wherein said apparatus includes a controlled device operable in opposite directions in accordance with the departure of the tube output current from the preselected value corresponding to a balanced condition of said oscillatory circuit, and said rebalancing means includes means operable by said controlled device for adjusting the current through said saturating core reactor.

8. An electronic measuring or control apparatus as claimed in claim 6 wherein said rebalancing means includes a source of direct current and a multiple section network comprising the output circuit of said tube, the potential distribution across the respective sections of said network varying with changes in the oscillatory current output of said tube, and circuit elements connecting said saturating core reactor across points on said network between which the potential drop is varied by a change in the output of said tube.

9. In an electronic measuring or control apparatus of the type including an electronic oscillator tube, a circuit network connected to said tube and normally balanced to establish a preselected oscillatory circuit flow in the output section of said network, means responsive to variations in a selected control factor to disturb the normal balance and thereby alter the output current flow in the output section of the network, and means responsive to a change in the output current flow to rebalance the circuit network; characterized by the fact that said rebalancing means includes a saturating core reactor having a direct current core-saturating winding connected between points in the output section of said network across which the direct current potential drop varies with change in the oscillatory current flow in said output section network, the alternating current winding of said saturating core reactor being included in the input section of said network to affect the balance thereof.

10. In an electronic measuring or control apparatus, an electronic oscillator tube and associated normally balanced oscillatory circuit for determining the frequency and magnitude of the oscillatory current output of said tube, a controlled device operable in response to departures of the current output of said tube from a preselected normal value, a saturating core reactor for reflecting an impedance change into said oscillatory circuit, and means movable by said controlled device to control the impedance reflected into said oscillatory circuit by said saturating core reactor, thereby to rebalance the oscillatory circuit upon an initial unbalance thereof that alters the current output of said tube.

11. In an electronic measuring or control system responsive to variations in the magnitude of a selected control factor, an electronic tube, an input circuit network coupled to said tube and normally balanced at a preselected desired value of said control factor to develop a predetermined current output from said tube, an output circuit network coupled to said tube and including means responsive to a departure of the tube output current from said predetermined value to rebalance the input circuit network at a new control factor value differing from said preselected desired value, and time-delay means including a temperature-variant impedance for resetting said input circuit network in balance at the preselected desired value of said factor.

12. In an electronic measuring or control system, the invention as set forth in claim 11, in combination with means for rendering said time-delay means inoperative to reset the input circuit network in balance at the preselcted desired value of said factor.

13. In an electronic measuring or control system responsive to variations in the magnitude of a selected control factor, the combination with an electronic tube, an input circuit network coupled to said tube and normally balanced at a preselected desired value of said control factor to develop a predetermined current output from said tube, an output circuit network coupled to said tube and including means responsive to a departure of the tube output current from said predetermined value to rebalance the input circuit network at a new control factor value differing from said preselected desired value, time-delay means for resetting said input circuit network in balance at the preselected desired value of said factor, and automatic means for reversing the sense of operation of said time-delay resetting means, upon a departure of the magnitude of said control factor in a given sense from the normal control range that includes said preselected desired value, to shift the control range in the given sense from its normal control range value.

14. In an electronic measuring or control apparatus, the combination with an electronic oscillator tube, an amplifier tube working out of said oscillator tube, a circuit network associated with said tubes and normally balanced to establish a preselected current output for said amplifier tube, said network including an oscillatory input circuit for said oscillator tube, means responsive to the departure of a selected control factor from a desired value to unbalance the network and thereby alter the current output of said amplifier tube, and means responsive to a variation of the amplifier tube current output to rebalance said circuit network at a new control factor value differing from said desired value, of time-delay means for resetting said circuit network in balance at said desired value of the selected control factor.

15. In an electronic measuring or control apparatus, an electronic oscillator tube, an amplifier tube working out of said oscillator tube, a circuit network associated with said tubes and normally balanced to establish a preselected current output for said amplifier tube, said network including an oscillatory input circuit for said oscillator tube and means responsive to the departure of a selected control factor from a desired value to unbalance the network and thereby alter the current output of said amplifier tube, and means responsive to a variation of the amplifier tube current output to rebalance said circuit network at a new control factor value differing from said desired value, said rebalancing means including an inductance coupled to said oscillatory input circuit, a variable impedance in circuit with said inductance, and means responsive to a variation in the current output of said amplifier tube to alter the effective magnitude of said variable impedance.

16. In an electronic measuring or control apparatus, the combination with an electronic oscillator tube, an oscillatory circuit coupled to said tube and normally balanced to establish a predetermined normal current output from said tube, means responsive to a departure of a selected control factor from a preselected desired value to unbalance said oscillatory circuit and thereby alter the current output of said tube, and means responsive to a variation in the current output of said tube to rebalance said oscillatory circuit at the new control factor value differing from said preselected desired value, thereby to restore the current output of said tube to its preselected normal value, of time-delay means for resetting said oscillatory circuit in balance at the preselected desired value of said control factor.

17. In an electronic measuring or control apparatus, the invention as recited in claim 16 wherein said resetting means comprises a temperature-variant impedance coupled to said oscillatory circuit, a heater resistance for determining the effective value of said impedance as a function of current flow through said heater resistance, and means responsive to a departure of the current output of the tube from its normal value to alter the current through said heater resistance.

18. In an electronic measuring or control apparatus, the invention as recited in claim 16 wherein said resetting means comprises a pair of temperature-variant impedances coupled to said oscillatory circuit and operative upon like variations in magnitude to affect in opposite sense the current output of said tube, a heater resistance associated with each of said impedances to determine the effective magnitude thereof as a function of the current through the heater resistance, and means responsive to a departure of current output of the tube from its normal value to alter in opposite sense the current flows to the respective heater resistances.

19. In an electronic measuring or control apparatus, the invention as recited in claim 16 wherein said resetting means comprises a pair of temperature-variant condensers coupled to said oscillatory circuit, an increase in the values of said condensers tending respectively to increase and to decrease the oscillatory current output of said tube, a heater resistance for each condenser, and means responsive to a departure of the current output of said tube from its normal value to alter in opposite sense the currents supplied to the respective heater resistances.

20. In an electronic measuring or control apparatus, the invention as recited in claim 16 wherein said resetting means comprises a pair of temperature-variant impedances connected to said oscillatory circuit and operative upon like variations in magnitude to affect in opposite sense the current output of said tube, a heater resistance associated with each of said impedances to determine the effective magnitudes of said impedances, and means for altering in opposite sense the currents supplied to the respective heater resistances; said last means including a pair of current-flow control elements, circuits including a polarity reversing switch connecting the respective current-flow control elements to said heater resistances, means responsive to limited magnitude departures of the current output of the tube from its normal value to adjust said current-control elements in opposite sense, and means responsive to larger magnitude departures of said tube current output from its normal value to actuate said polarity reversing switch.

21. In an electronic measuring or control apparatus, the invention as recited in claim 16 wherein said oscillatory circuit comprises a pair of coupled coils; and said resetting means comprises a circuit including in series an inductance coupled to one of said coils and a temperature-variant resistance, a heater resistance thermally coupled to said temperature-variant resistance, and means responsive to a departure of the current output of said tube from its selected normal value to alter the current to said heater resistance.

22. In an electronic measuring or control apparatus, the invention as recited in claim 16 wherein said oscillatory circuit comprises a pair of coupled coils; and said resetting means comprises a pair of circuits each including in series an inductance coupled to a coil of said oscillatory circuit and a temperature-variant resistance, a heater resistance thermally coupled to each temperature-variant resistance, and means responsive to a departure of the current output of said tube from its normal value to alter in opposite sense the currents through the respective heater resistances.

23. In an electronic measuring or control apparatus, an electronic oscillator tube, a circuit network including an oscillatory input circuit and an output circuit for said tube, said network being normally balanced to establish a predetermined normal current flow in said output circuit, means responsive to a departure of a selected control factor from a preselected value to unbalance said circuit network to alter the current flow in said output circuit, and means to rebalance the circuit network at a control factor value differing from said preselected value, thereby to restore the current flow in said output circuit to its preselected normal value; one of said means comprising a reactance of variant effective magnitude in said oscillatory input circuit for affecting the balance of said network, and means including an adjustable impedance for determining the effective magnitude of said reactance.

24. In an electronic measuring or control apparatus, the combination of an electronic oscillator tube, an oscillatory circuit coupled to said tube and normally balanced to establish a predetermined normal current ouput from said tube, means responsive to a departure of a selected control factor from a preselected desired value to unbalance said oscillatory circuit and thereby alter the current output of said tube, and means to rebalance said oscillatory circuit at the control factor value differing from said preselected desired value, thereby to restore the current output of said tube to its preselected normal value; said rebalancing means including an inductance coupled to said oscillatory circuit, a variable impedance in circuit with said inductance, and means responsive to a departure of the current output of said tube from its normal value to alter the effective magnitude of said variable impedance.

25. In an electronic measuring or control apparatus, the invention as set forth in claim 24, wherein said last means comprises an adjustable resistance.

26. In an electronic measuring or control apparatus, the invention as set forth in claim 24, wherein said last means comprises a metal-cored inductance, and means for adjusting the position of the core with respect to the associated inductance.

27. In an electronic measuring or control apparatus, the invention as set forth in claim 24, in combination with time-delay means responsive to an initial unbalance of said oscillatory circuit to effect a further unbalance thereof in the same sense and of a magnitude of the order of the initial unbalance, thereby to reset the oscillatory circuit to a balance at the preselected desired value of the control factor.

28. In heating apparatus, an outer chamber and means for supplying heat energy thereto, an inner chamber for receiving material to be heated, a device adjustable to regulate the supply of heat energy to said outer chamber, and means for adjusting said device; said adjusting means comprising a control apparatus including an element responsive to the temperature within said outer chamber and means to adjust said device to maintain the outer chamber temperature at a selected value, and a second control apparatus including an element responsive to the temperature within said inner chamber and means to adjust said first control apparatus to alter the selected control value of the temperature to be established within said outer chamber.

29. In heating apparatus, the invention as recited in claim 28, wherein said second control apparatus includes time-delayed resetting means to rebalance said second control apparatus at a preselected temperature value that is to be maintained within said inner chamber.

30. In heating apparatus, the invention as recited in claim 28, wherein said second control apparatus comprises an electronic control apparatus including an electronic oscillator tube and an oscillatory circuit coupled to said tube and normally balanced to establish a preselected normal oscillatory current output from said tube, means to unbalance said oscillatory circuit upon a departure of the inner chamber temperature from its selected control value, thereby to alter the current output of said tube, means responsive to the altered current output to vary the selected control value of the outer chamber temperature, and means responsive to the altered current output to rebalance said oscillatory circuit to restore the current output to its preselected normal value at the then existing temperature within said inner chamber.

31. In heating apparatus, the invention as recited in claim 28, wherein said second control apparatus comprises an electronic control apparatus including an electronic oscillator tube and an oscillatory circuit coupled to said tube and normally balanced to establish a preselected normal oscillatory current output from said tube, means to unbalance said oscillatory circuit upon a departure of the inner chamber temperature from its selected control value, thereby to alter the current output of said tube, means responsive to the altered current output to vary the selected control value of the outer chamber temperature, means responsive to the altered current output to rebalance said oscillatory circuit to restore the current output to its preselected normal value at the then existing temperature within said inner chamber, and time-delay resetting means for restoring said oscillatory circuit to balance at the preselected control value of the inner chamber temperature.

32. In heating apparatus, an outer chamber and means for supplying heat energy thereto, an inner chamber for receiving material to be heated, a device adjustable to regulate the supply of heat energy to said outer chamber, and means for adjusting said device in accordance with temperature fluctuations within either or both of said chambers; said adjusting means comprising a primary and a secondary control apparatus each including an electronic oscillator tube and an oscillatory circuit coupled to the tube to determine the oscillatory current output thereof, means to unbalance the oscillatory circuits of the primary and secondary control apparatus upon departures from selected control values of the temperatures within said inner and said outer chamber respectively, thereby to alter the output currents of the respective tubes, means responsive to a departure from normal of the output current of either tube to rebalance the associated apparatus to restore the tube output current to its normal value, means responsive to an unbalance of the secondary control apparatus to adjust said device to alter the rate of supply of heat energy to said outer chamber, and means responsive to an unbalance of the primary control apparatus to unbalance the secondary control apparatus, thereby to effect an adjustment of said device and a rebalance of the secondary control apparatus at a new selected control value.

33. In heating apparatus, an outer chamber and means for supplying heat energy thereto, an inner chamber for receiving material to be heated, a device adjustable to regulate the supply of heat to said outer chamber, and means for adjusting said device to maintain the inner chamber temperature at substantially a constant selected control value; said adjusting means comprising a primary electronic control apparatus responsive to temperature within said inner chamber to vary the magnitude of the temperature to be maintained within said outer chamber, a secondary electronic control apparatus responsive to temperature within said outer chamber to adjust said device to maintain the outer chamber temperature at the magnitude determined by said primary control apparatus.

34. In heating apparatus, the invention as set forth in claim 33, wherein said secondary electronic control apparatus includes an electronic oscillator tube, an oscillatory circuit coupled to said tube and normally balanced to establish the current output from said tube at a selected normal value, means responsive to a change in said current output to adjust said device, means responsive to a departure of the inner chamber temperature from the then existing control magnitude to unbalance said oscillatory circuit, thereby to alter the current output of said tube, means controlled by said primary electronic control apparatus to unbalance said oscillatory circuit, and means responsive to a change in the output current of said tube to rebalance the oscillatory circuit to restore the current output at its selected normal value.

35. In heating apparatus, the invention as recited in claim 33, wherein said second electronic control apparatus includes a temperature-measuring system having a pointer carrying a vane and a relatively stationary cooperating element, the position of said vane with respect to said element controlling the operation of said secondary electronic control apparatus; and said primary electronic control apparatus includes means for displacing said relatively stationary element upon a departure of the inner chamber temperature from a selected value.

36. An electronic measuring or control apparatus for automatically maintaining desired conditions during the operation of a major apparatus, said measuring and control apparatus comprising an electronic tube, an oscillatory circuit coupled to said tube and normally balanced to establish a preselected oscillatory current output from said tube, a controlled apparatus selectively energized in accordance with departures of said current output from its preselected value corresponding to a balance of said oscillatory circuit, a plurality of means responsive to different control factors to unbalance said oscillatory circuit upon the departure of any control factor magnitude from its selected value, and means responsive to a change in the output current to rebalance said oscillatory circuit to restore said output current to its preseleced value.

37. An electronic measuring or control apparatus for automatically maintaining desired conditions during the operation of a major apparatus, said measuring and control apparatus comprising an electronic tube, an oscillatory circuit coupled to said tube and normally balanced to establish a preselected oscillatory current output from said tube, a controlled apparatus selectively energized in accordance with departures of said current output from its preselected value corresponding to a balance of said oscillatory circuit, means responsive to changes in the value of a control factor to unbalance said oscillatory circuit upon the departure of the control factor magnitude from a selected value, additional means coupled to said oscillatory circuit for unbalancing the same thereby to condition said apparatus for operation at a different selected value of the control factor, and means responsive to a change in the output current to rebalance said oscillatory circuit to restore said output current to its preselected value.

38. An electronic measuring and control apparatus for automatically maintaining desired conditions during the operation of a major apparatus, said measuring and control apparatus comprising an electronic tube, an oscillatory circuit coupled to said tube and normally balanced to establish a preselected oscillatory current output from said tube, a controlled apparatus selectively energized in accordance with departures of said current output from its preselected value corresponding to a balance of said oscillatory circuit, a measuring instrument having a moving system for displacing a pointer in accordance with fluctuations in the magnitude of a control factor, a vane on said pointer and movable thereby with respect to a relatively fixed element, said vane and cooperating element constituting means for unbalancing said oscillatory circuit upon a departure of the control factor magnitude from a preselected value, additional means operable automatically in accordance with the desired conditions to be maintained to unbalance said oscillatory circuit, and means responsive to a change in the tube output current to rebalance the oscillatory circuit to restore the tube output current to its preselected value.

39. An electronic measuring and control apparatus for automatically maintaining desired conditions during the operation of a major apparatus, said measuring and control apparatus comprising an electronic tube, an oscillatory circuit coupled to said tube and normally balanced to establish a preselected oscillatory current output from said tube, a controlled apparatus selectively energized in accordance with departures of said current output from its preselected value corresponding to a balance of said oscillatory circuit, a measuring instrument having a moving system for displacing a pointer in accordance with fluctuations in the magnitude of a control factor, a vane on said pointer and movable thereby with respect to a relatively fixed element, said vane and cooperating element constituting means for unbalancing said oscillatory circuit upon a departure of the control factor magnitude from a preselected value, means operable automatically in accordance with the desired conditions to be maintained to displace said element with respect to said vane, thereby to unbalance said oscillatory circuit, and means responsive to a change in the tube output current to rebalance the oscillatory circuit to restore the tube output current to its preselected value.

40. In an electronic tube circuit, a tube, an oscillatory circuit coupled to said tube, an output circuit coupled to said tube, a coil coupled to said oscillatory circuit, a temperature-variant resistance in circuit with said coil, and a heater resistor in heat-transfer relation to said temperature-variant resistance.

41. An electronic measuring or control apparatus of the type including an electronic tube having a resonant input circuit network and an output circuit network, a device in the output circuit network responsive to variation in the tube output current, and a circuit including a variable impedance controlled by a variable factor for affecting the balance condition of the networks and thereby the tube output current; characterized by the fact that said circuit is inductively coupled to one of said networks, and said variable impedance is non-capacitive and variable in response to changes in the magnitude of said variable control factor.

42. An electronic measuring and control system as recited in claim 41, wherein said resonant input circuit includes a pair of coupled inductances and associated capacitive reactance conditioning said electronic tube to operate as an oscillator, and said circuit is coupled to one of said input circuit inductances.

43. An electronic measuring or control apparatus of the type including an electronic tube having a resonant input circuit network, an output circuit network, a device in the output circuit network responsive to variation in the tube output current, and means responsive to at least one variable factor for controlling the tube output current; characterized by the fact that said means includes a circuit coupled to one of said networks; said circuit comprising, in series, a temperature-variant resistance and a coil coupled to an inductance in one of said networks, a heater resistance in heat-transfer relation to said resistance, and circuit means for establishing through said heater resistance a current that varies in magnitude with said factor.

44. An electronic measuring or control apparatus as defined in claim 43, wherein said first means includes a pair of circuits coupled to one of said networks; each circuit including a temperature-variant resistance in series with a coil coupled to an inductance in the network, a heater resistance in heat-transfer relation to each resistance of the respective circuits, a current source for establishing currents through said heater resistances, and said circuit means adjusts in opposite sense the currents through said heater resistances, whereby the tube output current is independent of fluctuations in the voltage of said current source.

45. In an electronic measuring or control circuit responsive to variations in the magnitude of a selected control factor, the combination with an electronic tube, an oscillatory input circuit for said tube and normally balanced at a preselected control factor value to develop a predetermined oscillatory current output from said tube, said input circuit including coupled inductances, and an output circuit network for said tube including a device responsive to changes in the magnitude of said oscillatory output current, of variable impedance circuit means coupled to an inductance of said input circuit for affecting the balance of said oscillatory input circuit, thereby to change the magnitude of the oscillatory current output; said variable impedance circuit means including a variable non-capacitive impedance element and a coil comprising a few turns of wire inductively coupling said variable impedance circuit means to an inductance of the oscillatory input circuit.

46. In an electronic measuring or control circuit, the invention as recited in claim 45, wherein said variable impedance element comprises a temperature-variant resistor, and means controlled by said device for regulating the temperature of said resistor in accordance with the magnitude of the oscillatory current output, whereby the effective resistance of said resistor varies with the oscillatory current output to affect the balance condition of said oscillatory input circuit.

47. An electronic measuring or control apparatus of the type including an electronic tube having a resonant input circuit network and an output circuit network, a device in the output circuit network responsive to variations in the tube output current, and a circuit for affecting the balance condition of said input circuit network and thereby the tube output current; characterized by the fact that said circuit is inductively coupled to said input circuit network and includes a variable magnitude non-capacitive impedance.

48. An electronic measuring or control apparatus as recited in claim 47, wherein said impedance comprises a coil and a metal member movable with respect to the coil to vary the inductive impedance thereof.

49. An electronic measuring or control apparatus as recited in claim 47, wherein said impedance is an adjustable resistance.

50. An electronic measuring or control apparatus as recited in claim 47, wherein said input circuit network includes a pair of coupled inductances and associated capacitive reactance conditioning said electronic tube to operate as an oscillator, one of said inductances having a grounded terminal; and the variable impedance of said circuit is an adjustable inductance, said circuit being inductively coupled to said grounded inductance at the end thereof adjacent the grounded terminal.

51. An electronic measuring or control apparatus as recited in claim 47, wherein said input circuit network includes a pair of coupled inductances and associated capacitive reactance conditioning said electronic tube to operate as an oscillator, one of said inductances having a grounded terminal; and the variable impedance of said circuit is an adjustable inductance, said circuit being inductively coupled to said grounded inductance at the end thereof adjacent the grounded terminal and having a conductive connection to the grounded terminal of said grounded inductance.

GEORGE A. F. MACHLET.